United States Patent [19]
Hochheimer et al.

[11] 3,961,307
[45] June 1, 1976

[54] EXPLORATION OF THE BOUNDARIES OF AN UNDERGROUND COAL SEAM

[75] Inventors: Hans-Joachim Hochheimer, Recklinghausen; Hans Haas, Essen; Hans-Ludwig Jacob, Recklinghausen; Paul Helling, Herne; Bernhard Wülk, Essen, all of Germany

[73] Assignee: Ruhrkohle Aktiengesellschaft, Essen, Germany

[22] Filed: Sept. 10, 1974

[21] Appl. No.: 504,768

[30] Foreign Application Priority Data
Sept. 12, 1973 Germany............................ 2345884

[52] U.S. Cl.................... 340/15.5 CP; 73/67.8 S; 181/104; 340/15.5 MC; 299/1
[51] Int. Cl.² ...................... G01V 1/00; G01V 1/22
[58] Field of Search................ 181/104; 73/71.5 US, 73/67.7, 67.85, 67.9; 299/1; 340/15.5 CP, 15.5 MC

[56] References Cited
UNITED STATES PATENTS

| | | |
|---|---|---|
| 3,346,068 | 10/1967 | Woods et al................ 340/15.5 MC |
| 3,371,964 | 3/1968 | Weber..................................... 299/1 |
| 3,766,519 | 10/1973 | Stephenson.................. 340/15.5 CP |
| 3,858,167 | 12/1974 | Stas et al. .................... 340/15.5 CP |

Primary Examiner—Maynard R. Wilbur
Assistant Examiner—H. A. Birmiel
Attorney, Agent, or Firm—Karl F. Ross; Herbert Dubno

[57] ABSTRACT

Pulses of monochromatic coherent sound waves are emitted at an underground test station into a coal seam from several closely juxtaposed sources to form a beam whose reflection at a discontinuity in the seam is detected by a group of receivers. The time lapse between the outgoing and incoming sound pulses is a measure of the distance of the seam boundary from the test station and, upon a controlled shifting of the phases of the outgoing and/or incoming beam components, can be displayed on an oscilloscope screen as a function of sweep angle in an azimuthal and/or an elevational plane.

9 Claims, 4 Drawing Figures

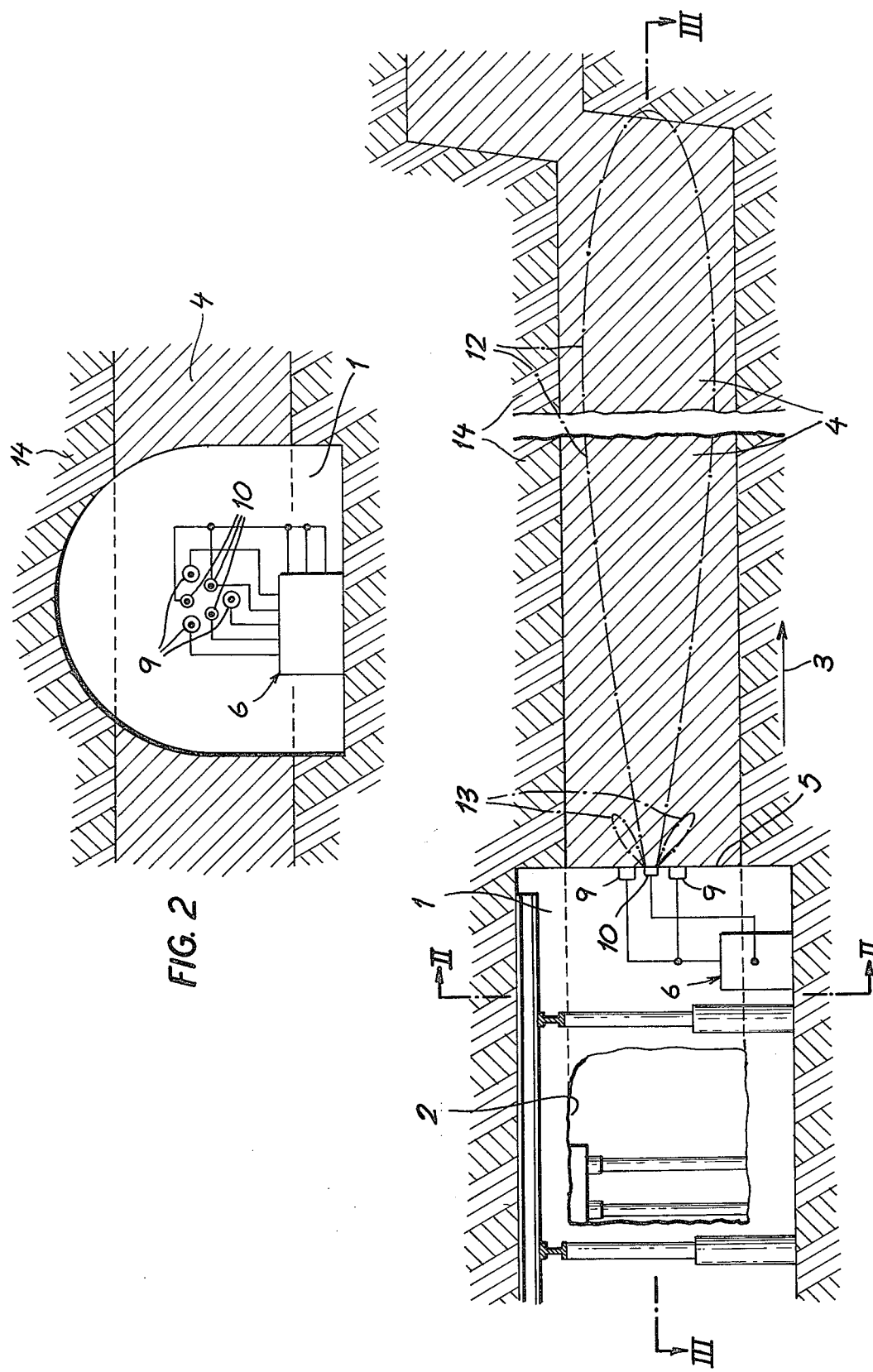

3,961,307

EXPLORATION OF THE BOUNDARIES OF AN UNDERGROUND COAL SEAM

FIELD OF THE INVENTION

Our present invention relates to coal mining and more particularly to the exploration of the boundaries of an underground coal seam to be mined.

BACKGROUND OF THE INVENTION

Attempts to use modulated (e.g. pulsed) sound waves for the exploration of terrain have been quite successful in the past but did not lead to satisfactory results below ground. So-called white noise, i.e. sound waves with a broad spectrum of acoustic frequencies, gives rise to reflections at discontinuities of the soil or rock in which it is propagated, yet these reflections cannot be readily evaluated to indicate the location of such discontinuities. That type of information, however, is highly important in mining operations in order to provide clues as to the extent and distribution of coal seams to be exploited. In the absence of this knowledge, equipment may be wastefully installed in low-yield areas or may be ineffectually utilized.

OBJECTS OF THE INVENTION

The general object of our present invention, therefore, is to provide a method of and means for efficiently exploring the boundaries of underground coal seams at depths on the order of 100m or more.

A more particular object is to provide means for graphically plotting the extent of a coal seam below ground.

SUMMARY OF THE INVENTION

In accordance with our present invention, modulated monochromatic sound waves are emitted from a location below ground into a coal seam to be explored. Reflections of these sound waves from a discontinuity of the seam are received at the same location, whereupon the time lapse between emission and reception of the sound waves is determined as a measure of the distance of the reflecting discontinuity from that location. The term "sound waves", as herein employed, is not limited to the audible range of the acoustic spectrum.

According to a more specific feature of our invention, two sets of electroacoustic transducers are used for the emission and the reception of the sound waves, the transducers of at least one of these sets being provided with phase-shifting means for generating a directive sound pattern with a well-defined major lobe pointing in a predetermined direction. Through suitable adjustment of these phase-shifting means it is possible to shift this major lobe (simply referred to hereinafter as the beam) in one or two planes so as to obtain an indication of distance over a desired sweep range. With the aid of a suitable indicator, such as an oscilloscope screen, a graphic representation of distance as a function of sweep angle can be produced.

In a particularly advantageous embodiment the emitting and receiving transducers are disposed in two interleaved triangular areas enabling both azimuthal and elevational beam shifts.

BRIEF DESCRIPTION OF THE DRAWING

The above and other features of our invention will now be described in detail with reference to the accompanying drawing in which:

FIG. 1 is a vertical section through an underground mine drift, showing a test station for the exploration of a coal seam;

FIGS. 2 and 3 are cross-sectional views taken on the lines II—II and III—III, respectively, of FIG. 1.

SPECIFIC DESCRIPTION

Figure 3:
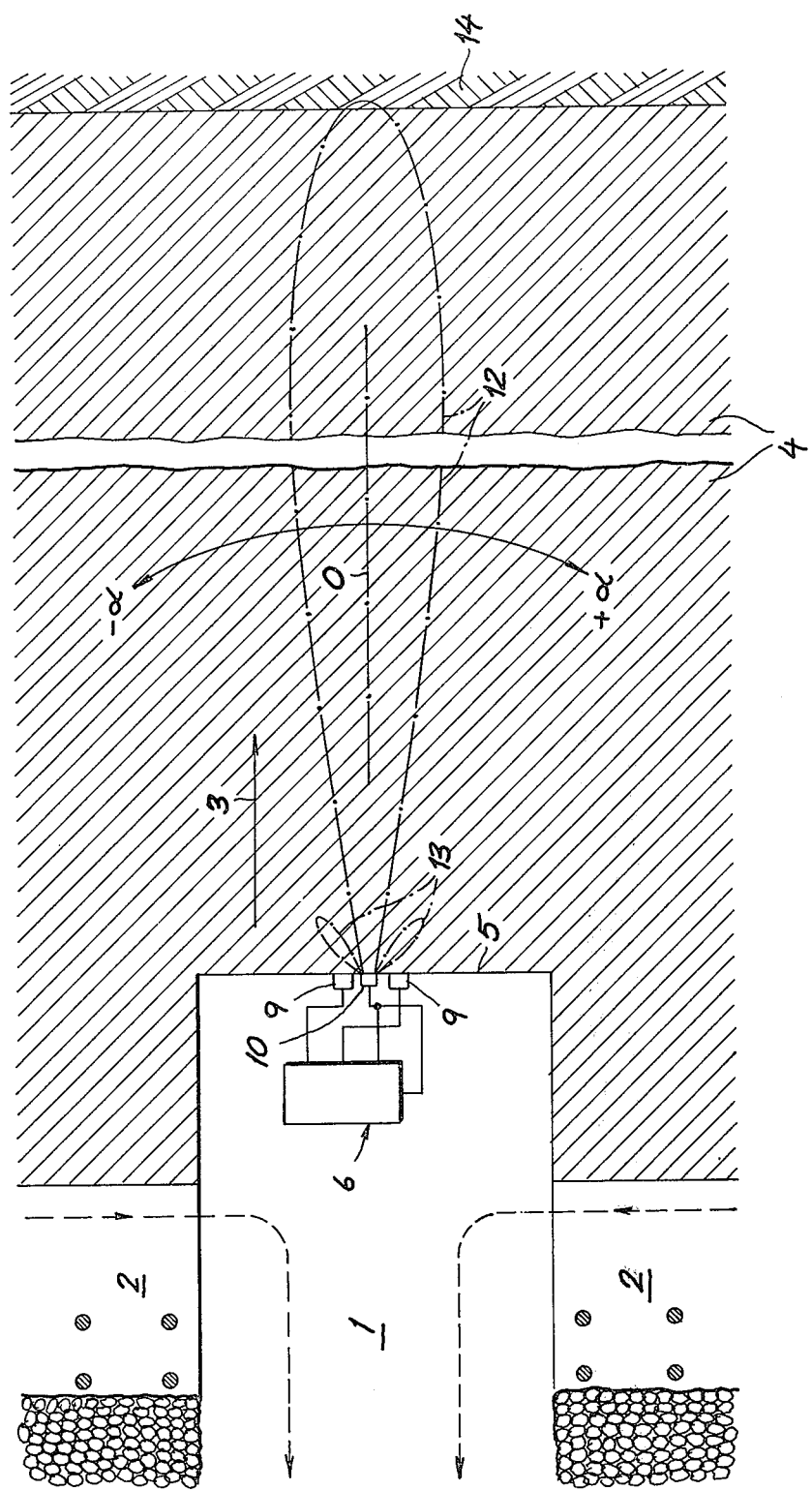

In FIGS. 1-3 we have shown a drift 1 of an underground coal mine provided with an adit 2. The drift 1 adjoins an underground coal seam 4 whose extent in various directions is to be explored. For this purpose there is disposed in the drift a test station, generally designated 6, comprising electronic equipment (more fully described hereinafter with reference to FIG. 4) for the operation of electroacoustic transducers, namely a first array of sound-emitting transducers 9 and a second array of sound-receiving transducers 10. The three emitting transducers 9 are located at the corners of a vertical equilateral triangle with downwardly pointing apex whereas the three receiving transducers 10 define the corners of a similar but smaller triangle with upwardly pointing apex in the plane of the first triangle, i.e. at the face or breast 5 of the seam 4.

Figure 4:
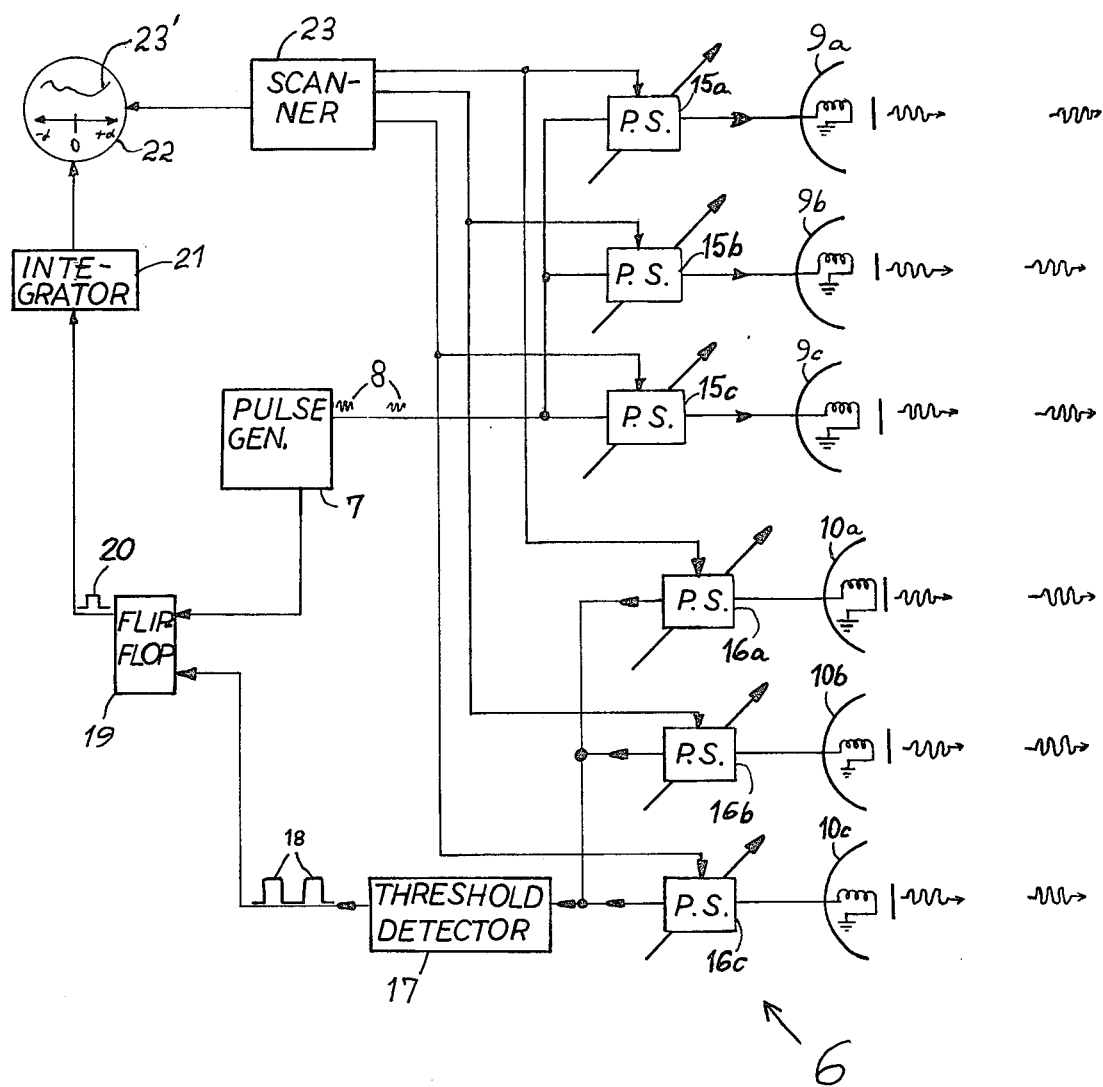
FIG. 4 is a block diagram of the electrical and acoustic components of the test station.

As shown in FIG. 4, test station 6 comprises an electric pulse generator 7 whose output in a succession of bursts 8 of a carrier wave of a fixed sonic or ultrasonic frequency. This pulse-modulated carrier wave is fed in parallel via adjustable phase shifters 15a, 15b and 15c to respective sound-emitting transducers 9a, 9b, 9c constituting the array of transducers 9 in FIGS. 1–3. These transducers, therefore, generate coherent and monochromatic sound waves at the carrier frequency, the relative phasing of these sound waves being determined by the adjustment of the associated phase shifters 15a–15c. With proper adjustment, these waves will form a directive pattern with a major lobe 12 (FIGS. 1 and 3) and some minor lobes 13, only the former being of interest here. At the boundary of seam 4 with the surrounding soil or rock 14, the sound waves will be reflected back toward station 6 with a directive component reaching the receiving transducers 10. The direction of the outgoing sound waves, indicated in FIG. 1 by an arrow 3, is here assumed to be horizontal but this is not necessarily the case.

The receiving transducers 10 of FIGS. 1—3 have been individually designated 10a, 10b and 10c in FIG. 4. Each of these transducers works through an associated adjustable phase shifter 16a, 16b, 16c into a threshold detector 17 which integrates the reconstituted carrier and produces an output, in the form of a pulse 18, whenever the amplitude of that carrier exceeds a predetermined level. Pulse generator 7 and threshold detector 17 control a flip-flop 19 which is set by the leading (or trailing) edge of a pulse 8 and reset by the leading (or trailing) edge of a pulse 18. The set output of flip-flop 19, therefore, is a succession of rectangular pulses 20 whose length is a measure of the time lapse between a pulse 8 and the corresponding pulse 18, this time lapse in turn being determined by the transit time of the sound waves in the seam 12. Since this transit time is generally known, the length of the seam in the transmission direction 3 can be readily determined.

Pulses 20 are fed to an integrator 21 which energizes the vertical sweep circuits of an oscilloscope 22 whose horizontal sweep circuits are controlled by a scanner 23, the latter also working into the phase shifters 15a–15c and 16a–16c to vary the beam angle (e.g. in the horizontal or azimuthal plane) within a predetermined sweep range $\pm\alpha$. Thus, the screen of the oscilloscope displays a trace 23' representing distance as a function of the sweep angle.

With the geometrical transducer arrangement shown in FIGS. 1–3, the mutual spacing of the emitting transducers 9 is twice that of the receiving transducers 10. Thus, if the latter spacing is an odd number of quarter wavelengths of the sound in the seam 4, the spacing of the transducers 9 will be a whole number of half wavelengths since the transducers 10 lie at the midpoints of the sides of the triangle defined by transducers 9.

A single set of phase shifters 15a–15c or 16a–16c is sufficient for the formation of a directive beam pattern in seam 4. A higher degree of directivity, however, is achieved with the use of two such sets as described and illustrated.

We claim:

1. A method of exploring the boundaries of a coal seam, comprising the steps of:
    emitting modulated monochromatic sound waves from a set of juxtaposed, coherently excited transmitting transducers at a location below ground into a coal seam to be explored, said location immediately adjoining said seam;
    detecting, through a set of juxtaposed receiving transducers at said location, beamed reflections of said sound waves from a discontinuity of said seam;
    scanning said discontinuity by operating at least one of said sets of transducers with a progressively varying phase relationship to change the direction of a major lobe of a directive pattern of said sound waves; and
    determining the distance from said location to said discontinuity from the time lapse between emission and reception of said sound waves in different scanning positions of said directive pattern.

2. A method as defined in claim 1 wherein said sound waves are periodically pulsed.

3. A method as defined in claim 2, comprising the further step of plotting said boundary from the distance measured in successive pulse periods.

4. A method as defined in claim 1 wherein the phases of corresponding transducers of said first and second sets are changed concurrently.

5. An apparatus for exploring the boundaries of a coal seam, comprising:
    sound-generating means including a first set of electroacoustic transducers at a location below ground, immediately adjoining a coal seam to be explored, provided with coherent-excitation means for emitting modulated monochromatic sound waves into said seam;
    sound-detecting means including a second set of electroacoustic transducers at said location for receiving beamed reflections of sound waves from a discontinuity of said seam, at least one of said sets of transducers being provided with adjustable phase-shifting means for setting up a directive sound pattern with a shiftable major lobe;
    timing means connected to said sound-generating and sound-detecting means for determining the time lapse between emission and reception of said sound waves as a measure of the distance of said discontinuity from said location;
    scanning means connected to said phase-shifting means for sweeping said major lobe over a predetermined angular sweep range, and
    indicator means connected to said scanning means and to said timing means for registering the magnitude of said distance in terms of sweep angle.

6. An apparatus as defined in claim 4, further comprising electric pulse-generating means connected to said first set of transducers and to said timing means.

7. An apparatus as defined in claim 5 wherein said indicator means comprises an oscilloscope.

8. An apparatus as defined in claim 1 wherein each of said sets of transducers is an array of three transducers at the corners of an equilateral triangle.

9. An apparatus as defined in claim 8 wherein said arrays are substantially coplanar, the corners of one triangle coinciding substantially with the midpoints of the sides of the other triangle.

* * * * *